(No Model.)
F. W. VAUGHAN.
WHEEL CULTIVATOR.
No. 476,707. Patented June 7, 1892.
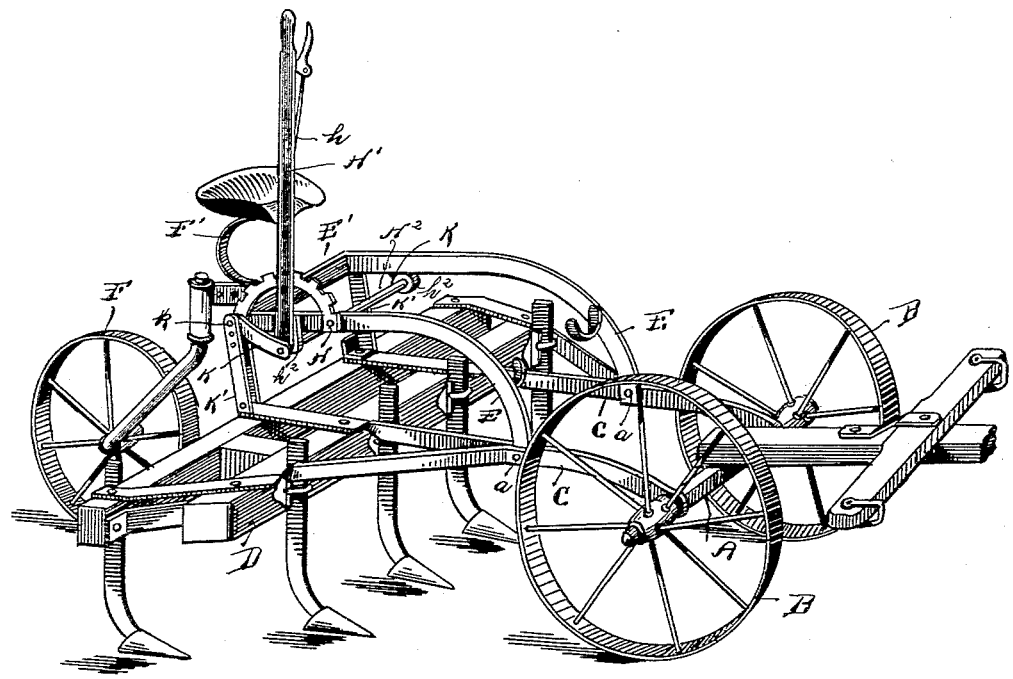
Witnesses.
Inventor,

UNITED STATES PATENT OFFICE.

FRED W. VAUGHAN, OF SAN FRANCISCO, CALIFORNIA.

WHEEL-CUTIVATOR.

SPECIFICATION forming part of Letters Patent No. 476,707, dated June 7, 1892.

Application filed December 14, 1891. Serial No. 414,977. (No model.)

*To all whom it may concern:*

Be it known that I, FRED W. VAUGHAN, a citizen of the United States, residing at San Francisco, in the county of San Francisco and State of California, have invented certain new and useful Improvements in Wheel-Cultivators; and I do hereby declare the following to be a full, clear, and exact description of said invention, such as will enable others skilled in the art to which it most nearly appertains to make, use, and practice the same.

The present invention has relation to certain new and useful improvements in wheel-cultivators for orchards, &c., as will be hereinafter more fully set forth in the drawing, which is a perspective view, described, and pointed out in the specification.

Practical experiments have demonstrated the fact that in cultivators of the foregoing class the attaching of the riding attachment or main frame directly to the horizontal axle tends to greatly spring the same. Consequently the main object of my invention is to so secure the riding attachment that the weight and strain thereof will be distributed between the rear supporting-wheel of the cultivator and drag-bars for the shovel-carrying standard, thus relieving the front axle of such strain.

Referring to the drawing forming a part of the specification, wherein similar letters of reference denote corresponding parts throughout, the letter A is used to represent the front horizontal axle, and B the ground-wheels mounted on the outer ends thereof. To said axle I movably couple the forward ends of drag-bars C, which at their rear ends are secured to shovel-carrying standard-beam D, which is raised or lowered by the hereinafter-described mechanism. The main frame or riding attachment consists of the curved pieces E, united by rear cross bar or plate E'. At its forward end the main frame is supported by drag-bars C, to which curved pieces E are secured by bolts or pins $a$, and at its rear end is upheld by rear ground-wheel F. The driver's seat is connected to the main frame by means of spring F', as shown. Consequently nearly, if not all, of the driver's weight is brought to bear directly upon the rear ground-wheel, while weight of main frame is distributed between said rear ground-wheel and drag-bars C, and inasmuch as said bars are connected to shovel-carrying beams, which by means of shovel-standards always being within or resting upon the ground, it is obvious that such weight as bears thereon is upheld by the beam resting on the ground. Consequently the direct strain is transferred from front axle. To the main frame or riding attachment is fastended lever-quadrant H, within teeth of which works lower end of catch-rod $h'$, secured to hand-lever H', which is rigidly connected to cross-rod $H^2$ journaled in depending projections $h$. To each end of said cross-rod is secured short rearwardly-extending arms K, the outer ends of which are movably connected to arms K', secured at their lower ends to shovel-carrying beam. Consequently as hand-lever H', which is within easy reach of the driver, is moved forward or backward cross-rod $H^2$ is rotated, which throws arms K up or down, and inasmuch as same are movably secured to arms K', secured to beam, it is obvious that the shovel-carrying beam is raised or lowered. By providing arms K' with openings $k$ it will be seen that same may be readily lengthened or shortened in order to increase or decrease depth of cultivation.

The raising and lowering mechanism working on each side of the riding attachment, as shown, it is obvious that the shovel-carrying standard-beam is maintained rigidly in position—that is, it is prevented from wabbling, which results from suspending the lifting mechanism between the curved pieces of the main frame. Consequently while passing through uneven soil the shovel-carrying beam is not permitted to move up or down at its ends, thus giving even depth of furrow throughout, which does not result where the beam is allowed end vertical movement.

Having thus described my invention, what I claim as new, and desire to secure by Letters Patent of the United States, is—

1. The combination, in a cultivator, with the front axle, of the drag-bars movably coupled at their ends to said axle, a shovel-carrying beam secured to rear ends of the drag-bars, main frame secured at its forward end to the drag-bars direct, and the rear ground-wheel for supporting rear of said frame, as and for the purpose set forth.

2. In a cultivator, the combination, with the drag-bars movably secured to the horizontal axle, of the main frame connected at its forward end to the drag-bars, the rear ground-wheel supporting rear portion of the main frame, operating mechanism for raising or lowering the shovel-carrying beam, consisting of the hand-lever connected to rotatable cross-rod working in bearing in the main frame, rearwardly-extending arms projecting from said rod, and connecting-arms movably secured to the rearwardly-extending arms and to the beam, as and for the purpose set forth.

3. In a cultivator, the combination, with the drag-bars, of the main frame consisting of the curved pieces at their forward ends, being secured to the drag-bars, the rear ground-wheel for supporting rear portion of the main frame, and the driver's seat secured to the riding attachment, as and for the purpose set forth.

In testimony whereof I affix my signature in presence of two witnesses.

FRED W. VAUGHAN.

Witnesses:
J. W. KEYS,
N. A. ACKER.